US008892663B2

(12) United States Patent
Shin et al.

(10) Patent No.: US 8,892,663 B2
(45) Date of Patent: Nov. 18, 2014

(54) APPARATUS AND METHOD FOR ESTABLISHING PARTNERSHIP WITH A PEER-TO-PEER (P2P) SERVICE BASED ON GOSSIP

(75) Inventors: Sung-Jae Shin, Hwaseong-si (KR); Joon-Ho Cho, Suwon-si (KR); Seong-Ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 13/086,574

(22) Filed: Apr. 14, 2011

(65) Prior Publication Data

US 2011/0258270 A1   Oct. 20, 2011

(30) Foreign Application Priority Data

Apr. 19, 2010   (KR) .......................... 10-2010-0036023

(51) Int. Cl.
*G06F 15/16*   (2006.01)
*H04L 29/08*   (2006.01)

(52) U.S. Cl.
CPC ........ *H04L 67/1046* (2013.01); *H04L 67/1053* (2013.01)
USPC ........................................................ 709/206

(58) Field of Classification Search
USPC .......................................... 709/203, 206, 227
See application file for complete search history.

(56) References Cited

U.S. PATENT DOCUMENTS

| 7,848,339 | B2 | 12/2010 | Yamamoto | |
|---|---|---|---|---|
| 2007/0115868 | A1* | 5/2007 | Chen et al. | ..................... 370/315 |
| 2008/0107122 | A1* | 5/2008 | Lai et al. | ........................ 370/401 |
| 2009/0180489 | A1 | 7/2009 | Fujita et al. | |
| 2010/0017619 | A1* | 1/2010 | Errico | ........................... 713/186 |

FOREIGN PATENT DOCUMENTS

| JP | 2009-171056 | 7/2009 |
|---|---|---|
| JP | 2009-171156 | 7/2009 |
| JP | 2009-212791 | 9/2009 |
| JP | 2009-213122 | 9/2009 |

* cited by examiner

*Primary Examiner* — El Hadji Sall
(74) *Attorney, Agent, or Firm* — NSIP Law

(57) ABSTRACT

Provided is gossip-based peer-to-peer service apparatus and a method for quickly establishing a partnership. A first node that desires to join a service receives partial view information of a second node from the second view that is participating in the service. In response to receiving the partial view information from the second node, the first node extracts one or more candidate nodes to establish a partnership with, and engages the candidate nodes in a temporal partnership.

18 Claims, 5 Drawing Sheets

APPARATUS AND METHOD FOR ESTABLISHING PARTNERSHIP WITH A PEER-TO-PEER (P2P) SERVICE BASED ON GOSSIP

CROSS-REFERENCE TO RELATED APPLICATION(S)

This application claims the benefit under 35 U.S.C. §119(a) of Korean Patent Application No. 10-2010-0036023, filed on Apr. 19, 2010, in the Korean Intellectual Property Office, the entire disclosure of which is incorporated herein by reference for all purposes.

BACKGROUND

1. Field

The following description relates to gossip protocol-based peer-to-peer (P2P) service technology.

2. Description of the Related Art

Gossip protocol-based peer-to-peer (P2P) service technology statistically ensures connectivity for all nodes in a network even when an individual node on the network does not know about all other nodes on the network.

A typical example of the gossip protocol-based P2P service technology is scalable membership protocol (SCAMP). SCAMP allows an individual node in a network to flexibly retain a certain number of partial nodes even when the node does not know information about all nodes that are participating in a service. SCAMP also enables connectivity of the entire network. According to SCAMP, because all nodes including a node having data operate in the same manner, reliability of the service may be easily maintained without generating a service problem caused by single point of failure.

In addition to SCAMP, various gossip protocols such as Shuffle, CyClon, HyParView, and CoolStreaming have been employed. Generally, when a node desires to join a service, the node must first go through a membership process based on a probability model and establish a partnership with other nodes that are already participating in the service. This membership process causes a time delay to occur because the newly joined node needs to find a partner node for data exchange.

SUMMARY

In one general aspect, there is provided a gossip-based peer-to-peer (P2P) service apparatus comprising a membership list receipt unit configured to receive a membership list from at least one service node from among a plurality of service nodes that provide a gossip-based P2P service, wherein the membership list comprises information about partial view nodes of the at least one service node that are members of the gossip-based P2P service, and a temporal partnership request unit configured to select at least one partial view node from the received membership list and transmit a temporal partnership request message to the selected partial view node for data exchange.

The temporal partnership request unit may be configured to receive a response to the temporal partnership request message from the selected partial view node and add the selected partial view node to a temporal partnership list.

The gossip-based P2P service apparatus may further comprise a data communication unit configured to perform the data exchange with the selected partial view node in the temporal partnership list.

The gossip-based P2P service apparatus may further comprise a join request unit configured to transmit a join request message for requesting to join the gossip-based P2P service to at least one of the plurality of service nodes.

The membership list may comprises information about partial view nodes that have established membership with the at least one service node.

In another aspect, there is provided a gossip-based peer-to-peer (P2P) service apparatus comprising a join request receipt unit configured to receive a join request message from a node that desires to join a gossip-based P2P service, and a membership list provision unit configured to provide the node with a membership list comprising information about partial view nodes that are members of the gossip-based P2P service, in response to the join request message.

The membership provision unit may be configured to transmit a partnership request message comprising the membership list and access information allowing access to the gossip-based P2P service apparatus.

The gossip-based P2P service apparatus may further comprise a partnership is management unit configured to receive a response to the partnership request message from the node and to add the node to a partnership list.

In another aspect, there is provided a gossip-based peer-to-peer (P2P) service apparatus comprising a first node that desires to join a gossip-based P2P service, a second node that is a member of the gossip-based P2P service, and a third node that is a member of the gossip-based P2P service and that has established membership with the second node as a partial view node of the second node, wherein the second node provides a membership list regarding the third node to the first node, and the first node transmits a temporal partnership request message to the third node for data exchange with the third node based on the membership list.

In response to receiving the temporal partnership request message from the third node, the first node may add the third node to a temporal partnership list and perform the data exchange with the third node.

The second node may transmit to the first node a partnership request message comprising the membership list and access information allowing access to the second node.

In response to receiving the partnership request message from the first node, the second node may add the first node to a partnership list.

In another aspect, there is provided a method of establishing partnership of a gossip-based peer-to-peer (P2P) service apparatus including a plurality of nodes, the method comprising transmitting a join request message from a first node that desires to join a gossip-based P2P service, transmitting a membership list to the first node from a second node that is participating in the gossip-based P2P service, in response to the join request message, wherein the membership list includes one or more partial view nodes of the second node, and selecting, by the first node, a partial view node from the membership list and transmitting a temporal partnership request message to the selected partial view node for data exchange.

The method may further comprise receiving, at the first node, a response to the temporal partnership message from the selected partial view node, and adding, at the first node, the selected partial view node to a temporal partnership list and performing the data exchange with the selected partial view node for the gossip-based P2P service.

The method may further comprise forwarding, by the second node, the join request message to an arbitrary node that is participating in the gossip-based P2P service, and establishing a partnership between the first node and the arbitrary node that has received the join request message.

Other features and aspects will be apparent from the following detailed description, the drawings, and the claims.

Figure 1:
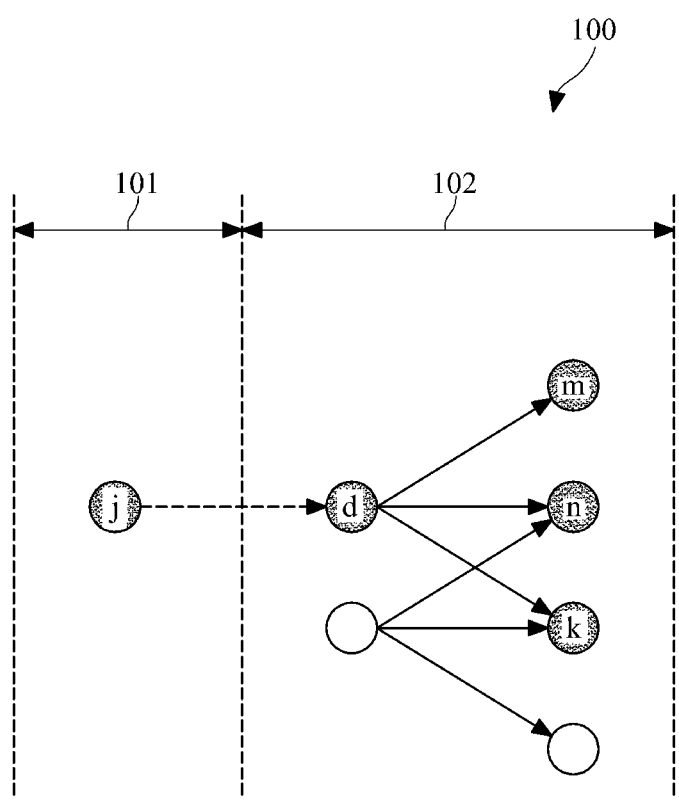
FIG. 1 is a diagram illustrating an example of a gossip-based peer-to-peer (P2P) service system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

As described herein, a node may refer to, for example, a mobile terminal, a base station, a desktop computer, a laptop computer, a hub, a router, a bridge, a switch, a server, and the like.

FIG. 1 illustrates an example of a gossip-based peer-to-peer (P2P) service system.

Referring to FIG. 1, the gossip-based P2P service system 100 includes a plurality of nodes 101 and 102. In this example, the nodes 101 and 102 are classified into a node 101 that desires to join a service and nodes 102 that are already participating in the service. For example, nodes 101 and 102 may be a digital TV, a set-top box, a mobile phone, an access gateway, and the like. The node j 101 that desires to join the gossip-based P2P service may transmit a service join request message to node d. For example, node d may be a contact node or a deputy node that is participating in the service. In this example, node d has a partial view that includes node m, node n, and node k, which are members of the same P2P service as node d.

In response to receiving the service join request message, node d provides a membership list to node j. For example, the membership list may include information of a partial view of a node that receives the service join request message. For example, the membership list of node d may include access information such as a node ID, an IP address, a port number, and the like, about one or more of the nodes m, n, and k. The membership list may include status information, for example, resource information such as the use amount of network bandwidth/CPU, information of a partner that transceives data with a peer, and the like. For example, node d may transmit the access information and status information of the nodes m and n to the node j.

Node j that has received the membership list selects at least one node from the member list. For example, node j may select node m from the received membership list. The selection criteria may be set in various ways based on the purpose of use and applications. For example, a node may be selected arbitrarily as shown in the example of FIG. 1. As another example, a node may be selected based on a weight previously set using the access information and status information acquired by message exchange. As another example, several nodes may be selected.

Node j that has selected node m may transmit a temporal partnership request message to node m to exchange data with node m. Node m that has received the temporal partnership request message may add node j to its own temporal partnership list, and transmits to node j an acknowledgement message containing information that allows node j to access node m. In response to receiving the acknowledgement message, node j may add node m to its own temporal partnership list and exchanges data with node m.

Accordingly, if node j desires to join the service, partnership between node j and the other nodes d, m, n, and k may be established simultaneously with the acquisition of membership based on the partial view of node d.

In addition, for example, if node d selectively provides the membership list, in response to the service join request message from node j, the node d may issue a partnership add request message to node j to request to add node d to a partnership list. For example, the partnership add request message may include access information and status information of node d in addition to the membership list.

In response to receiving the partnership add request message, node j may add node d to its own partnership list, may record the membership list received from node d in the temporal membership list, and/or may transmit an acknowledgement message to node d. Node d that has received the acknowledgement message from node j may add node j to the partnership list.

Figure 2:
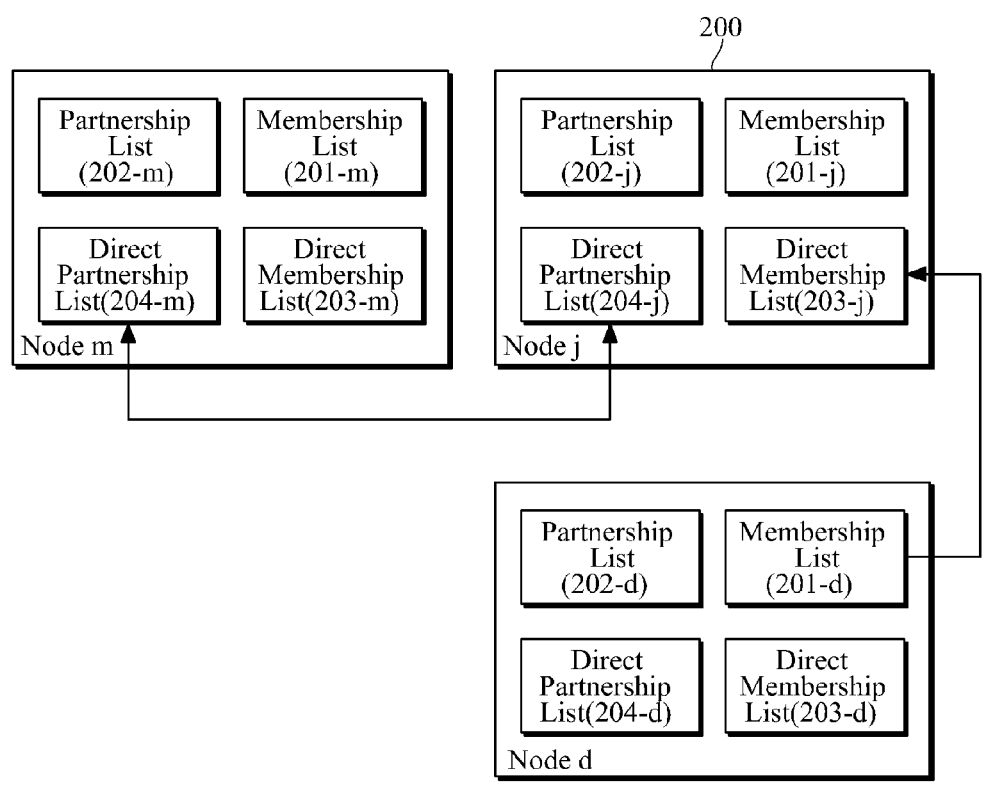
FIG. 2 is a diagram illustrating an example of a node list.

FIG. 2 illustrates an example of a node list.

Referring to FIG. 2, the node list 200 includes a membership list 201-j, a partnership list 202-j, a direct membership list 203-j, and a direct partnership list 204-j.

The membership list 201-j may include information about neighboring passive nodes. For example, the membership list 201-j may store information about partial view nodes of the node j.

The partnership list 202-j may include information about active nodes that perform data exchange. For example, the partnership list 202-j may store one or more of the nodes included in the membership list 201-j.

The direct membership list 203-j may include information about candidate active nodes for establishing a temporal partnership. For example, the direct membership list 203-j may store some or all of a membership list received from another node, for example, a membership list 201-d received from node d.

The direct partnership list 204-j may include information about active nodes in a temporal partnership. For example, the direct partnership list 204-j may include one or more of the nodes included in the direction membership list 203-j.

For example, node information stored in the direct membership list 203-j and the direct is partnership list 204-j may be deleted or moved to the membership list 201-j and/or the partnership list 202-j based on the condition of the network.

Figure 3:
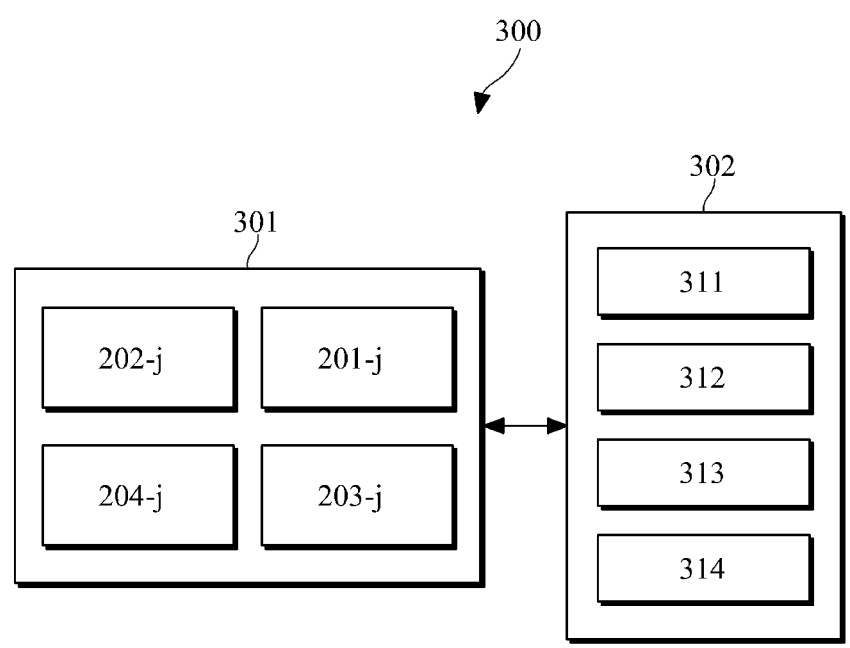
FIG. 3 is a diagram illustrating an example of a gossip-based P2P service apparatus.

FIG. 3 illustrates an example of a gossip-based P2P service apparatus. The example shown in FIG. 3 may be an example of node j shown in the example illustrated in FIG. 1.

Referring to FIGS. 1 and 3, gossip-based P2P service apparatus 300 includes a list storage unit 301 and a list management unit 302. For example, the list storage unit 301 may store the membership list 201-*j*, the partnership list 202-*j*, the direct membership list 203-*j*, and the direct partnership list 204-*j*, as shown in FIG. 2. The list management unit 302 includes a join request unit 311, a membership list receipt unit 312, a temporal partnership request unit 313, and a data communication unit 314.

The join request unit 311 may generate a join request message for joining a gossip-based P2P service, and may transmit the generated join request message to a node participating in the service. For example, the join request unit 311 may transmit the join request message to node d, as shown in FIG. 1.

The membership list receipt unit 312 may receive a membership list from at least one service node from among a plurality of service nodes that provide the gossip-based P2P service. For example, the membership list may correspond to a partial view node of the corresponding service node. For example, the membership list receipt unit 312 may receive information about node m and node n from node d. The membership list receipt unit 312 may record the received membership list in the direct membership list 203-*j*.

The temporal partnership request unit 313 may select at least one node from the received membership list, and may transmit a temporal partnership request message to the selected second node to exchange data. For example, the temporal partnership request unit 313 may select node m from the direct membership list 203-*j*, and transmit the temporal partnership request message to the selected node m.

For example, the temporal partnership request unit 313 may receive an acknowledgement of the temporal partnership request message from the node selected from the membership list, and add the selected node to the temporal partnership list. For example, when node m responds to the temporal partnership request message, the temporal partnership request unit 313 may store node m in the direct partnership list 204-*j*.

Figure 4:
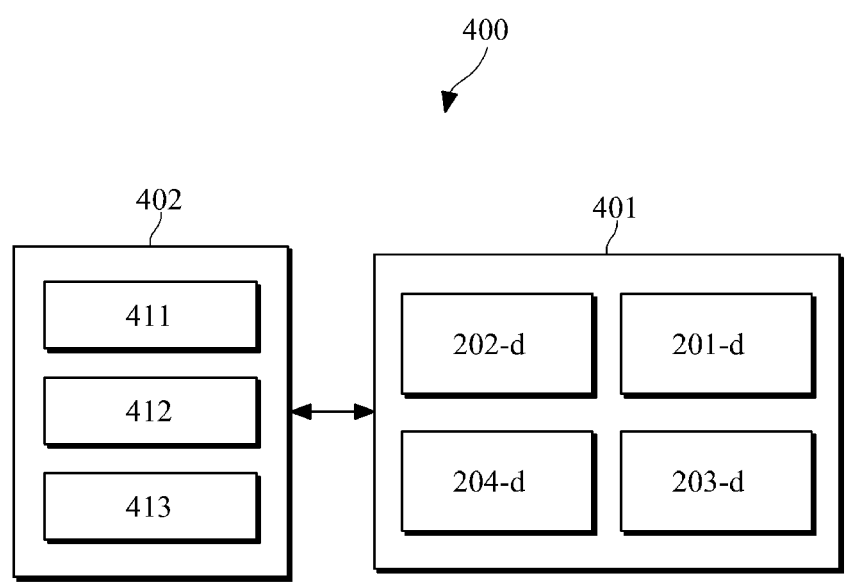
FIG. 4 is a diagram illustrating another example of a gossip-based P2P service apparatus.

FIG. 4 illustrates another example of a gossip-based P2P service apparatus. The example shown in FIG. 4 may be an example of node d shown in the example illustrated in FIG. 1.

Referring to FIGS. 1 and 4, gossip-based P2P service apparatus 400 includes a list storage unit 401 and a list management unit 402. For example, the list storage unit 401 may store the membership list 201-*d*, the partnership list 202-*d*, the direct membership list 203-*d*, and the direct partnership list 204-*d*, as shown in FIG. 2. In this example, the list management unit 402 includes a join request receipt unit 411, a membership list provision unit 412, and a partnership management unit 413.

The join request receipt unit 411 may receive a join request message from a node that desires to join a gossip-based P2P service. For example, the join request receipt unit 411 may receive a join request message from node j shown in FIG. 1.

In response to the join request message, the membership list provision unit 412 may provide a membership list including information about some or all of the partial view nodes that communicate directly with the apparatus 400 and that are members of the same service as the apparatus 400. For example, the membership list provision unit 412 may transmit some or all of the node information stored in the membership list 201-*d*.

The membership list provision unit 412 may selectively transmit a partnership request message containing the membership list and access information that allows another node to access the membership list provision unit 412. If an acknowledgement of the partnership request message is received from node j, the partnership management unit 413 may add the node j to the partnership list 202-*d*.

Figure 5:
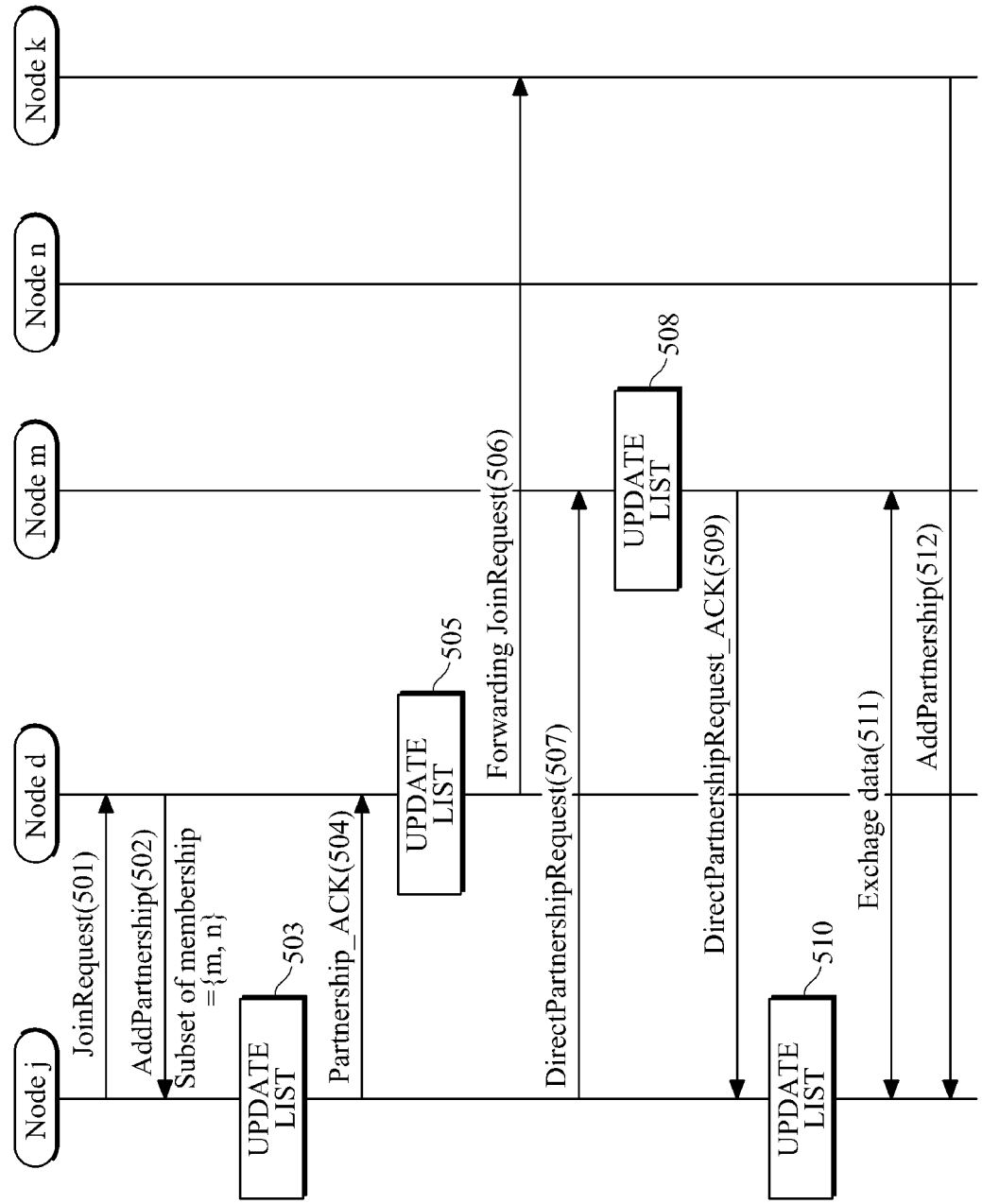
FIG. 5 is a flowchart illustrating an example of a method for establishing a partnership in a gossip-based P2P service apparatus.

FIG. 5 illustrates an example of a method for establishing a partnership in a gossip-based P2P service apparatus. The method for establishing a partnership is described with reference to FIGS. 1, 2, and 5.

In 501, node j that desires to join a service transmits a join request message to node d that is participating in the service.

In response to receiving the join request message, in 502 node d transmits a partnership add request message to node j to request node j to add the node d to the partnership list 202-*j* of node j. For example, the partnership add request message some or all of the information and membership list 201-*d* of node d. Accordingly, the membership list 201-*d* of node d may provide node j with information about nodes that are members of the same P2P network as node d, for example, information about nodes n, m, and/or k.

In response to receiving the partnership add request message, in 503 node j adds the information of node d which is contained in the partnership add request message to its own partnership list 202-*j*, and adds some or all of the information included in the membership list 201-*d* of node d to its own direct membership list 203-*j*.

In 504, in response to the partnership add request message, node j transmits an acknowledgement message to the node d.

In 505, node d that has received the acknowledgement message adds node j to its own partnership list 202-*d*, and in 506 node d forwards the service join request of node j to one of is partial view nodes of node d or another node (for example, node k) that is participating in the service. For example, if the partnership list 202-*d* of node d is full, node d may delete one partnership node and add node j.

In 507, node j selects node m using its own direct membership list 203-*j*, and transmits a temporal partnership request message to node m.

In response to receiving the temporal partnership request message, in 508 node m adds node j to its own direct partnership list 204-*m*, and in 509, node m transmits, to node j, an acknowledgement message including access information that node j may use to access node m.

In 510, node j that has received the acknowledgement message adds node m to its own direct partnership list 204-*j*, and exchanges data with node m, in 511.

Meanwhile, node k that has received the join request message may transmit a partnership add request message to node j, in 512. The subsequent procedures may be performed in the same manner as in 503 to 511. As an example, the partnership add request of node k may have a higher priority than a temporal partnership add request.

When a node fails to receive an acknowledgement from a certain node within a set period of time or confirm an acknowledgement from a certain node through a periodic exchange of an additional heartbeat message, the node may delete the certain node from a corresponding list. Furthermore, if a network condition is stabilized or a previously set period of time has elapsed after the temporal partnership establishment, the node of the direct partnership list 204 may be moved to the partnership list 202.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A gossip-based peer-to-peer (P2P) service apparatus comprising:
   a membership list receipt device configured to receive a membership list from at least one service node from among a plurality of service nodes that provide a gossip-based P2P service, prior to the gossip-based P2P service apparatus joining the gossip-based P2P service, wherein the membership list comprises access information about partial view nodes of the at least one service node that are members of the gossip-based P2P service; and
   a temporal partnership request unit configured to select at least one partial view node from the received membership list, transmit a temporal partnership request message to the selected partial view node, and become partners with the at least one partial view node and a member of the gossip-based P2P service based on the access information and without performing a membership process that is based on a probability calculation.

2. The gossip-based P2P service apparatus of claim 1, wherein the temporal partnership request unit is configured to receive a response to the temporal partnership request message from the selected partial view node and add the selected partial view node to a temporal partnership list.

3. The gossip-based P2P service apparatus of claim 2, further comprising:
   a data communication unit configured to perform the data exchange with the selected partial view node in the temporal partnership list.

4. The gossip-based P2P service apparatus of claim 1, further comprising:
   a join request unit configured to transmit a join request message for requesting to join the gossip-based P2P service to at least one of the plurality of service nodes.

5. The gossip-based P2P service apparatus of claim 1, wherein the membership list comprises information about partial view nodes that have established membership with the at least one service node.

6. A gossip-based peer-to-peer (P2P) service apparatus comprising:
   a join request receipt device configured to receive a join request message from a node that desires to join a gossip-based P2P service; and
   a membership list provision unit configured to provide the node with a membership list comprising access information about partial view nodes that are members of the gossip-based P2P service, in response to the join request message, prior to the node joining the gossip-based P2P service,
   wherein the access information enables the node with the membership list to become partners with one of the partial view nodes and a member of the gossip-based P2P service without performing a membership process that is based on a probability calculation.

7. The gossip-based P2P service apparatus of claim 6, wherein the membership list provision unit is configured to transmit a partnership request message comprising the membership list and access information allowing access to the gossip-based P2P service apparatus.

8. The gossip-based P2P service apparatus of claim 7, further comprising:
   a partnership management unit configured to receive a response to the partnership request message from the node and to add the node to a partnership list.

9. A gossip-based peer-to-peer (P2P) service apparatus comprising:
   a first node that desires to join a gossip-based P2P service;
   a second node that is a member of the gossip-based P2P service; and
   a third node that is a member of the gossip-based P2P service and that has established membership with the second node as a partial view node of the second node,
   wherein the second node provides a membership list including access information of the third node to the first node, prior to the first node joining the gossip-based P2P service, and the first node transmits a temporal partnership request message to the third node and enters into a partnership with the third node and becomes a member of the gossip-based P2P service based on the access information and without performing a membership process that is based on a probability calculation.

10. The gossip-based P2P service apparatus of claim 9, wherein, in response to receiving the temporal partnership request message from the third node, the first node adds the third node to a temporal partnership list and performs the data exchange with the third node.

11. The gossip-based P2P service apparatus of claim 9, wherein the second node transmits to the first node a partnership request message comprising the membership list and access information allowing access to the second node.

12. The gossip-based P2P service apparatus of claim 11, wherein in response to receiving the partnership request message from the first node, the second node adds the first node to a partnership list.

13. A method of establishing partnership of a gossip-based peer-to-peer (P2P) service apparatus including a plurality of nodes, the method comprising:

transmitting a join request message from a first node that desires to join a gossip-based P2P service;

transmitting a membership list to the first node from a second node that is participating in the gossip-based P2P service, in response to the join request message and prior to the first node joining the gossip-based P2P service, wherein the membership list includes access information of one or more partial view nodes of the second node; and selecting, by the first node, a partial view node from the membership list, transmitting a temporal partnership request message to the selected partial view node, and becoming a partner with the partial view node and a member of the gossip-based P2P service based on the access information and without performing a membership process that is based on a probability calculation.

14. The method of claim 13, further comprising:

receiving, at the first node, a response to the temporal partnership message from the selected partial view node; and adding, at the first node, the selected partial view node to a temporal partnership list and performing the data exchange with the selected partial view node for the gossip-based P2P service.

15. The method of claim 13, further comprising:

forwarding, by the second node, the join request message to an arbitrary node that is participating in the gossip-based P2P service; and establishing a partnership between the first node and the arbitrary node that has received the join request message.

16. The gossip-based P2P service apparatus of claim 1, wherein the membership list comprises a partial list, but not an entire list, of members of the gossip-based P2P service, and the temporal partnership request unit selects the partial node from the partial list of members of the gossip-based P2P service.

17. The gossip-based P2P service apparatus of claim 16, wherein the membership list comprises access information of nodes included in the partial list of members of the gossip-based P2P service.

18. The gossip-based P2P service apparatus of claim 16, wherein the membership list comprises status information of nodes included in the partial list of members of the gossip-based P2P service.

* * * * *